United States Patent
Canova

Patent Number: 5,828,194
Date of Patent: Oct. 27, 1998

[54] CONTROL CIRCUIT FOR CONTROL OF A DIRECT-CURRENT MOTOR NORMALLY EXCITED IN SERIES INCLUDING STRUCTURE FOR SEPARATE EXCITATION DURING BRAKING

[75] Inventor: Antonio Canova, Montevarchi, Italy

[73] Assignee: Magnetek S.p.A., Siena, Italy

[21] Appl. No.: 807,899

[22] Filed: Feb. 27, 1997

[30] Foreign Application Priority Data

Mar. 2, 1996 [IT] Italy .................................. FI96A0038

[51] Int. Cl.⁶ ........................................................ H02P 3/00
[52] U.S. Cl. .......................................... 318/290; 318/261
[58] Field of Search ................................... 318/280–290, 318/54, 56, 57, 63, 65, 256–258, 261, 269, 273

[56] References Cited

U.S. PATENT DOCUMENTS

| | | | |
|---|---|---|---|
| 3,571,683 | 3/1971 | Prezzi et al. ............................. | 318/258 |
| 3,843,912 | 10/1974 | Anderson ................................. | 318/258 |
| 3,944,898 | 3/1976 | Wright ..................................... | 318/258 |
| 4,267,492 | 5/1981 | Manners .................................. | 318/376 |
| 4,319,170 | 3/1982 | Brent ........................................ | 318/376 |
| 4,388,573 | 6/1983 | Horiuchi et al. ........................ | 318/376 |
| 4,479,080 | 10/1984 | Lambert .................................. | 318/373 |
| 4,677,356 | 6/1987 | Tsuneda et al. ......................... | 318/258 |
| 4,804,893 | 2/1989 | Melocik ................................... | 318/258 |
| 4,985,666 | 1/1991 | Nakabayashi ........................... | 318/434 |

*Primary Examiner*—Jonathan Wysocki
*Attorney, Agent, or Firm*—McGlew and Tuttle

[57] ABSTRACT

A control circuit provides, for connecting a motor to a d.c. voltage source (1), two half bridge (3, 7, 5, 9) each with a respective switch (3, 5) with controlled opening and closing; the first of the half bridge connects a pole of the excitation winding (13) to the source (1) and the second of the half bridge connects a pole of the armature (15) to the source (1). A control unit (11) controls the opening and closing of the two switches (3, 5) of the half bridge and the toggling of the reversing device as a function of the operating conditions of the motor. The control unit (11) is programmed in such a way that in the braking phase it toggles both of the controlled switches (3, 5) cyclically, simultaneously or independently, from an open condition to a closed condition and vice versa.

13 Claims, 3 Drawing Sheets

Fig. 1
(State of the art)
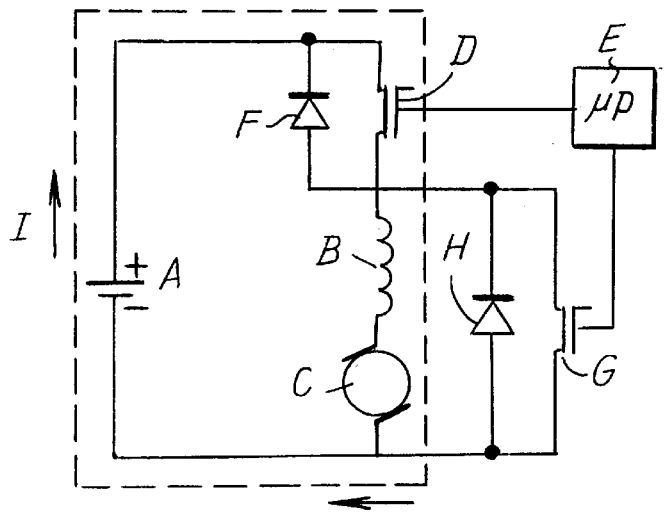
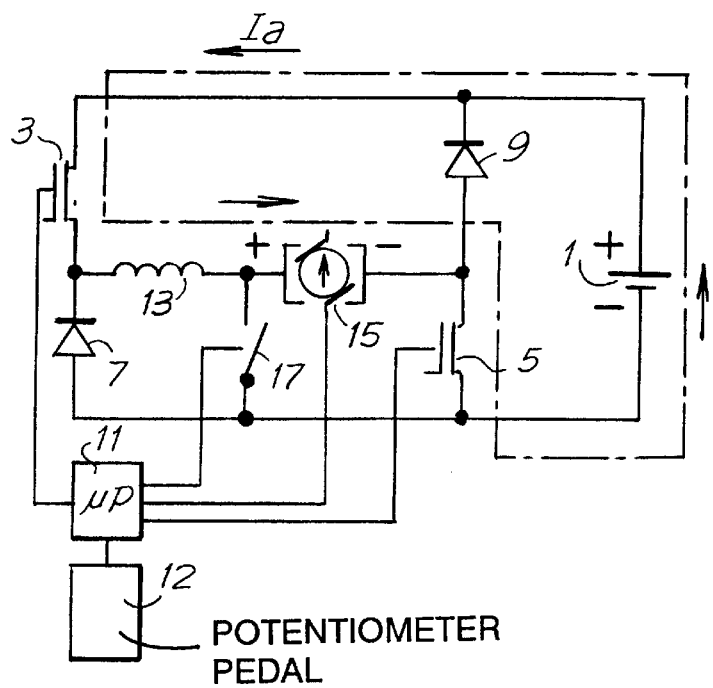
Fig. 2
POTENTIOMETER PEDAL
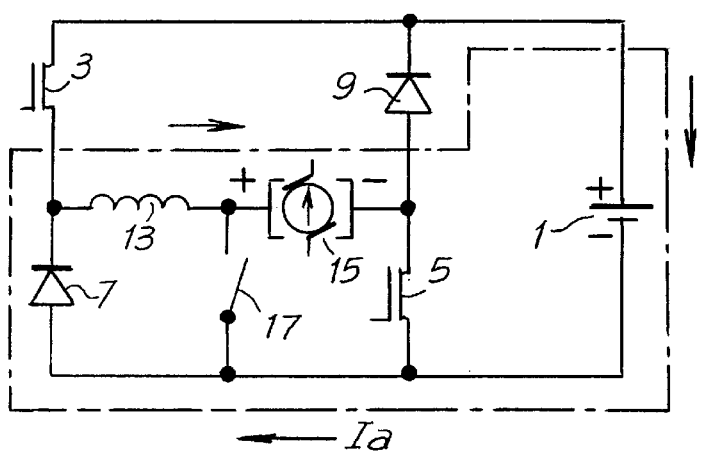
Fig. 3

CONTROL CIRCUIT FOR CONTROL OF A DIRECT-CURRENT MOTOR NORMALLY EXCITED IN SERIES INCLUDING STRUCTURE FOR SEPARATE EXCITATION DURING BRAKING

FIELD OF THE INVENTION

The invention relates to a control circuit for a direct-current electric motor, in particular for use in traction.

Direct-current electric motors are classified as a function of, inter alia, the type of excitation. More particularly, direct-current motors are divided into those with series, shunt or independent excitation. In the first type of motor, the excitation winding is connected in series to the rotor or armature winding. In the second case the excitation winding is connected in parallel to the rotor or armature winding. In the third case the current flowing through the excitation winding is independent of the current and voltage of the armature.

In the electric-traction sector the series-excited motor is used with greater frequency on account of certain peculiarities of its operating characteristic, which make it more appropriate for this type of use, in particular on account of its high pick-up torque.

STATE OF THE ART

Represented in FIG. 1 is a diagram of the control circuit of a direct-current electric motor with series excitation, according to the state of the art.

A indicates a voltage source, shown diagrammatically as a battery, but which can also be a supply line. The source A is connected to an excitation winding B placed in series with a rotor or armature C furnished with a contactor which reverses the armature winding in the event of reversal of direction. The connection between the source and the motor, comprising the excitation winding B and the armature C, is obtained through a switch D, for example a MOSFET, controlled by a microprocessor E, arranged in parallel with which is a diode F. G indicates a further switch controlled by the microprocessor E, arranged in parallel with which is a further diode H, for backflow.

While the motor is running, when the switch D is closed the current I supplied by the source A flows as indicated by the dashed line in FIG. 1 through the excitation winding B and through the armature C. The mean supply current can be modulated as a function of the motor running conditions by alternately making and breaking the controlled switch D. The torque developed by the motor is given by:

$$C = KI_a \Phi$$

and a counter-electromotive force given by $$E = k \Phi n$$

is developed on the armature, where:

Ia is the armature current, equal to the excitation current Ie, since the configuration is in series;
k, K are constants of proportionality;
$\Phi$ is the flux of the magnetic field B;
n is the number of turns of the motor.

When it is desired to brake the motor, the torque must be reversed. Very little energy is recovered in the braking phase with the diagram illustrated. In order to brake the motor it is necessary firstly to reverse the torque by acting on the contactor for reversing the direction. Following this, partial recovery of energy to the battery is obtained by modulating the switch G.

SUMMARY OF THE INVENTION

The object of the present invention is to provide a novel circuit for controlling a direct-current electric motor with series excitation, particularly suitable for traction, which allows better recovery of energy in the braking phase, as well as better control of the braking, which is particularly useful in the event that the motor is used in electric automobiles, for better driving comfort.

To this end, according to the invention, there is provided a control circuit in which: for connecting the motor to a d.c. voltage source there are provided two half bridges each comprising a respective switch with controlled opening and closing, the first of said half bridges connecting the first pole of the excitation winding to the source and the second of said half bridges connecting a pole of the armature to the source, a control unit controlling the opening and closing of the two switches of said half bridges and the toggling of the means of reversing the direction as a function of the operating conditions of the motor; and in which in the braking phase said control unit toggles both of said controlled switches cyclically from an open condition to a closed condition and vice versa. The toggling of the switches can occur simultaneously or independently, depending on the configuration of the circuit.

According to one possible embodiment of the circuit, the excitation winding and the armature are permanently connected in series.

According to a preferred embodiment of the circuit according to the invention there is moreover provided a controlled switch device positioned in such a way as to be able to connect the second pole of the excitation winding to the source, so as to connect together said excitation winding, said armature and said source alternately in a configuration with series excitation and a configuration with separate excitation.

In practice, the control unit can be programmed in such a way that, for the braking of the motor, it causes zeroing of the current in said armature, reverses the connection of the armature winding, and alternately makes and breaks said two switches of said half bridge for at least part of the braking, simultaneously or independently of one another. When the switch device is provided in order to change the configuration of the circuit from series excitation to separate excitation, the control unit is suitably programmed to close said switch device after the reversing of the connection of the armature winding.

The invention also relates to a method for the recovery braking of a normally series-excited electric motor, as defined in the appended method claims.

BRIEF DESCRIPTION OF THE DRAWINGS

The invention will be better understood by following the description and the attached drawing, which shows a practical non-limiting exemplification of the invention. In the drawing:

FIG. 1, already described, represents a conventional control circuit;

FIGS. 2 to 8 show a possible embodiment of the circuit according to the invention in different operating phases.

DETAILED DESCRIPTION OF THE INVENTION

Figure 4:
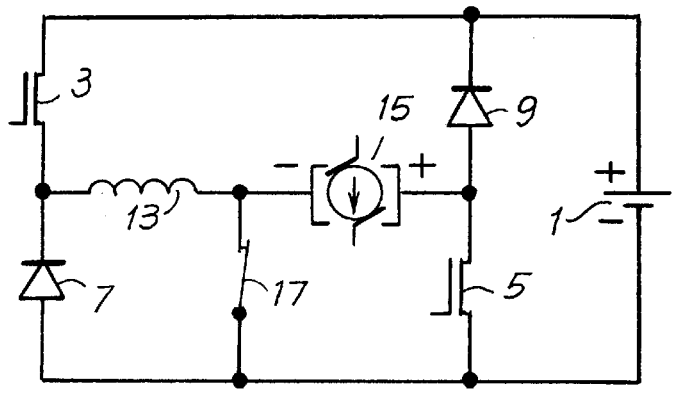

With initial reference to FIG. 2, indicated overall as 1 is a voltage source, represented diagrammatically by a battery. The battery is connected to the electric motor via two half bridges each half bridge comprising a respective switch 3, 5 with controlled closing and opening (for example a MOSFET) and a diode 7, 9. Represented as 11 is a central control unit for the switches 3, 5. The central unit 11 is interfaced with the user, in a manner known per se, via a potentiometer pedal or similar 12 and the like, which serves to control the speed of the motor and which constitutes (for example if used in a vehicle) the accelerator pedal. For clarity of representation the elements 11 and 12 are represented in FIG. 2 alone and are omitted from the remaining figures.

The motor comprises an excitation winding 13 connected (in the configuration of FIG. 2) in series with an armature or rotor winding 15, furnished in a manner known per se with an armature contactor for reversing the direction and for braking.

The circuit moreover comprises a normally open contactor 17 which, when toggled together with appropriate toggling of the controlled switches 3 and 5, makes it possible to change the configuration of the motor from series excitation to separate or independent excitation for energy recovery in the braking phase, in the manner which will be described below.

Under normal running conditions, the two controlled switches 3 and 5 may both be closed and the current $I_a$ (which represents both the battery current and also the armature and excitation current), delivered by the source 1, flows as indicated by the chain-dotted line in FIG. 2. Conversely, it is possible to control the current and prescribe the desired mean current as a function of the running conditions. For this purpose, one or both of the controlled switches 3 and 5 is/are acted upon. In particular, it is possible to provide for toggling both the switches 3 and 5 simultaneously from a make to a break condition, with specified turn-on and turn-off times, to obtain a specified mean current in the motor. Conversely, one of the two switches 3, 5 can be maintained in the make state and the current can be modulated by acting on the other of the two switches, taking it alternately into the break and make states.

When it is desired to brake the motor, the controlled switches 3, 5 are firstly opened. In this manner the circuit passes from the configuration of FIG. 2 to the configuration of FIG. 3, where the current Ia flows in the opposite direction through the diodes 7 and 9, charging the battery 1, until becoming zero. In this brief transient phase there is recovery of the magnetic energy stored in the motor, which is converted into potential energy in the battery 1.

When the current has become zero, the armature contactor is toggled and the contactor 17 is made to close, so that the circuit assumes the configuration of FIG. 4, i.e. a configuration with separate excitation. The braking phase continues in this configuration, with cyclical toggling of the switches 3 and 5 from a closed configuration to an open configuration. The on/off cycles of the two switches 3 and 5 are mutually independent. Thus, the switch 3 is brought alternately into make and break in order to modulate the excitation current $I_e$ and maintain the desired mean value thereof. Independently of the switch 3, the switch 5 is brought alternately into make and break in order to modulate current $I_a$ and obtain energy recovery in the manner described in greater detail below.

Figure 5:
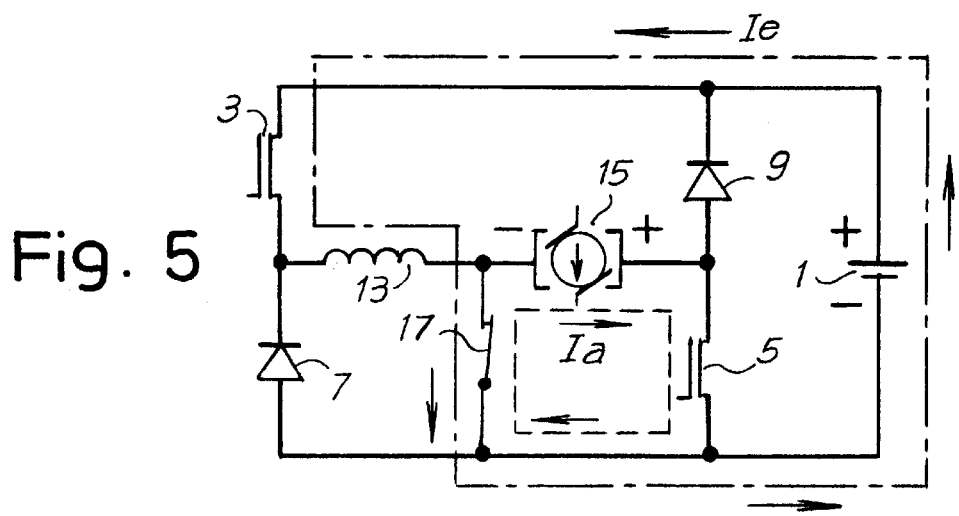

Represented in FIG. 5 is the phase in which the switches 3 and 5 are closed. In this phase the battery 1 delivers an excitation current $I_e$, which flows through the switch 3, the excitation winding 13 and the contactor 17, as shown by the chain-dotted line of FIG. 5. Since the armature is revolving, a counter-electromotive force is generated in it and causes the flow of an armature current $I_a$ which traverses the contactor 17 and the switch 5, in accordance with the dashed line of FIG. 5. This causes storage of energy in the form of magnetic energy at the expense of the kinetic energy of the vehicle in which the motor is mounted, which is braked. When the switch 5 is opened the circuit changes from the configuration of FIG. 5 to the configuration of FIG. 6. In this phase the armature current $I_a$ flows through the contactor 17 and the diode 9 The toggling of the switch 5 can be controlled in various ways, and typically modulation occurs at constant switching frequency, for example of the order of 15–20 kHz.

Recovery of magnetic energy as potential energy in the battery 1 is thus obtained.

Figure 6:
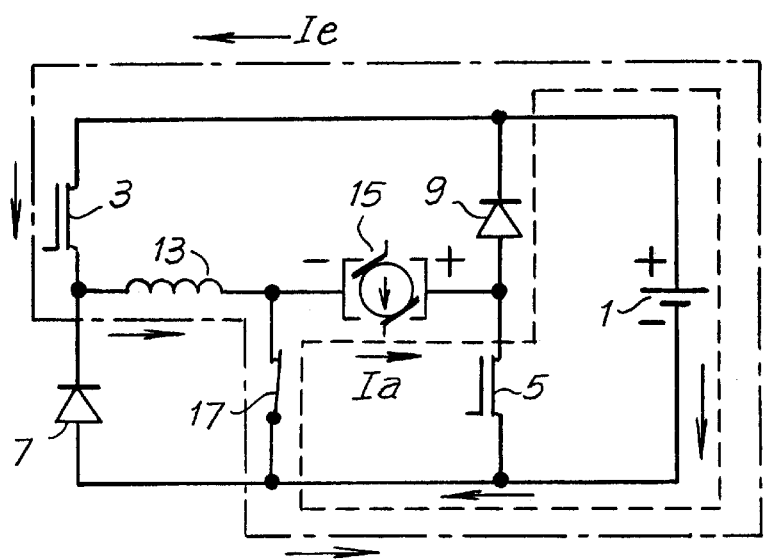

By cyclically toggling the switch 5 from the condition of FIG. 5 to the condition of FIG. 6 and vice versa it is possible to continue the recovery of mechanical energy under braking until the vehicle comes to a complete halt.

Figure 7:
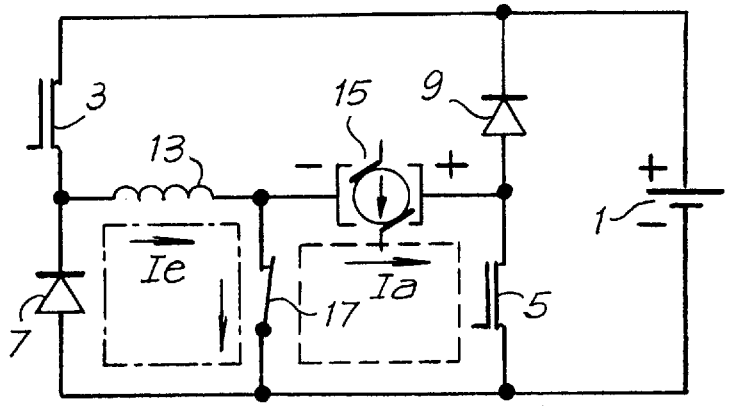
Figure 8:
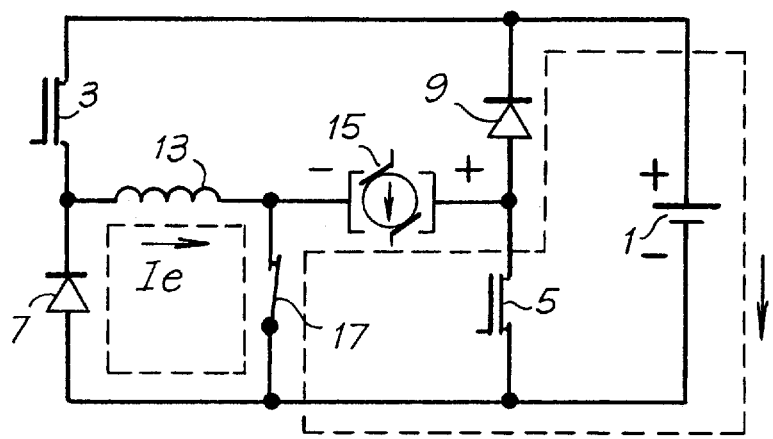

Superimposed on the cyclic toggling of the switch 5 from the break condition to the make condition and vice versa is the toggling of the switch 3 which serves to control the excitation current $I_e$. In FIG. 5 the switch 3 is closed and the excitation current $I_e$ flows through it from the battery into the excitation winding 13. In FIG. 6 the switch 3 is again closed, while in FIG. 7 the switch 3 is open and the switch 5 is closed. Shown in FIG. 8 is a condition in which the switch 3 and the switch 5 are both open. The paths of the currents $I_e$ and $I_a$ under both conditions can be seen in FIGS. 7 and 8.

Figure 9:
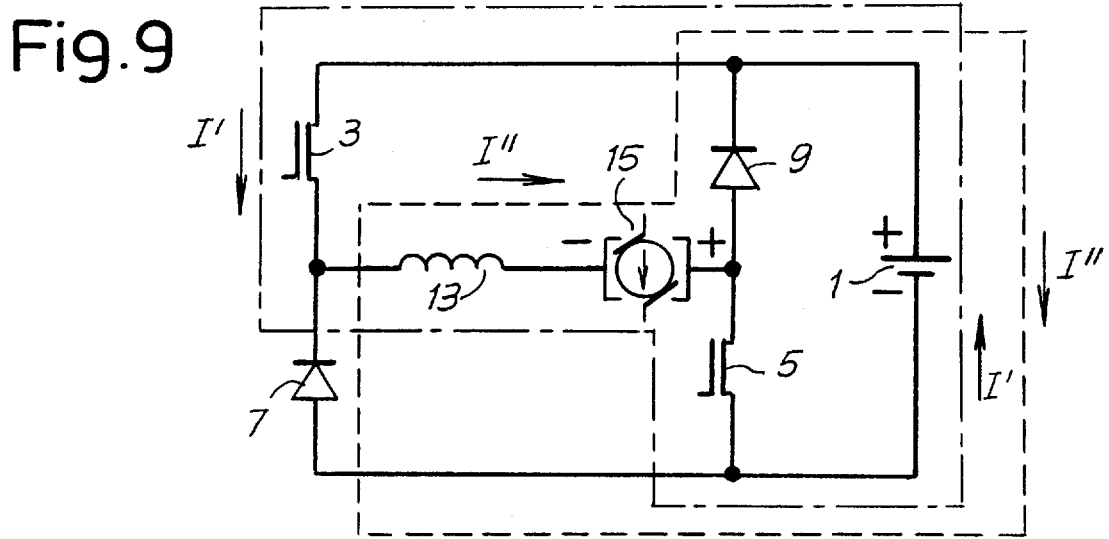
FIG. 9 shows a simplified embodiment of the circuit according to the invention.

Shown in FIG. 9 is a simplified circuit in which parts which are identical or correspond to those of the circuit of FIGS. 2 to 8 are indicated with the same reference numerals. The circuit of FIG. 9 differs from the circuit described earlier through the absence of the contactor 17. In said figure the circuit is shown in its braking setting, i.e. with the armature winding at reversed polarity with respect to the normal polarity under traction conditions. The switches 3 and 5 are alternately toggled into make and break conditions, but toggling is simultaneous for the two switches. When the switches 3 and 5 are closed, the current I' flows (chain-dotted line) from the battery 1 through the switch 3, the excitation winding 13, the armature 15 and the switch 5 and back to the battery 1. In this phase the rotary motion of the armature causes a conversion of kinetic energy into magnetic energy. When the circuit toggles into the condition in which the switches 3 and 5 are open there is a conversion of kinetic energy into electrical energy and of magnetic energy into electrical energy. Both phenomena contribute to the recharging of the battery 1 and hence to the recovery of energy in the form of potential energy. There is a flow of current I" (dashed line) which from the armature flows through the diode 9, the battery 1, the diode 7 and the excitation winding 13.

It is understood that the drawing shows merely an example given only as a practical demonstration of the invention, it being possible for this invention to vary in its forms and arrangements without however departing from the scope of the concept which underlies this invention. The possible presence of reference numerals in the enclosed claims has the purpose of facilitating the reading of the claims with reference to the description and drawing, and does not limit the scope of the protection represented by the claims.

I claim:

1. A circuit for the control of a direct-current electric motor normally excited in series, the circuit comprising:

a d.c. voltage source;

an excitation winding with a first pole and a second pole;

an armature with a first pole and a second pole;

reversing means for reversing the direction of rotation of the motor, said reversing means including a first half bridge for connecting the motor to said d.c. voltage source, said first half bridge including a first half bridge controlled switch for controlled opening and closing and a second half bridge for connecting the motor to said d.c. voltage source, said second half bridge including a second half bridge controlled switch for controlled opening and closing, said first half bridge connecting said first pole of said excitation winding to said d.c. voltage source and said second half bridge connecting a pole of said armature to said d.c. voltage source;

a control unit controlling the opening and closing of each of said first half bridge controlled switch and said second half bridge controlled switch and toggling said reversing means as a function of the operating conditions of the motor, said control unit being programmed for toggling both of said first half bridge controlled switch and said second half bridge controlled switch cyclically, simultaneously or independently from an open condition to a closed condition and from a closed condition to an open condition; and a controlled switch device positioned for connection of said second pole of said excitation winding to said d.c. voltage source for switching between a connection of said excitation winding and said d.c. voltage source and a connection of said armature and said source alternately to provide a configuration with series excitation and a configuration with separate excitation.

2. The circuit as claimed in claim 1, wherein said excitation winding and said armature are permanently connected in series.

3. The circuit as claimed in claim 1, wherein said control unit is programmed for braking of the motor including causing a zeroing of current in said armature, reversing a connection of the armature winding, and alternately making and breaking said first half bridge controlled switch and said second half bridge controlled switch at least during a part of the braking, simultaneously or independently of one another.

4. The circuit as claimed in claim 1, wherein said reversing means comprises an armature contactor for reversing the connection of the armature winding.

5. The circuit as claimed in claim 4, wherein said control unit is programmed to close said controlled switch device after the reversing of the connection of the armature winding.

6. A method for recovering mechanical energy during the braking of a direct-current electric motor normally excited in series, the method comprising the steps of:

providing a d.c. voltage source, an excitation winding and an armature which are connected to a voltage source, a first half bridge for connecting the motor to said d.c. voltage source, said first half bridge including a first half bridge controlled switch for controlled opening and closing, a second half bridge for connecting the motor to said d.c. voltage source, said second half bridge including a second half bridge controlled switch for controlled opening and closing, said first half bridge connecting said first pole of said excitation winding to said d.c. voltage source and said second half bridge connecting a pole of said armature to said d.c. voltage source;

controlling said first half bridge controlled switch and said second half bridge controlled switch with a central control unit and in order to effect braking with recovery said control unit causing a zeroing of current in said armature, reversing a connection of the armature winding, and alternately making and breaking said two switches for at least part of the braking, simultaneously or independently of one another; and changing, for braking, the configuration of the motor from series excitation to separate excitation with said control unit.

7. The method as claimed in claim 6, wherein one of said switches is toggled alternately from the open condition to the closed condition in order to maintain the magnetic field generated by the excitation winding at a controlled value.

8. The method as claimed in claim 6, wherein said first half bridge controlled switch and said second half bridge controlled switch are simultaneously toggled from a closed condition to an open condition and vice versa and in which said excitation winding and said armature are permanently connected in series.

9. A circuit for the control of a direct-current electric motor normally excited in series, the circuit comprising:

a d.c. voltage source;

an excitation winding with a first pole and a second pole;

an armature with a first pole and a second pole;

reversing means for reversing the direction of rotation of the motor, said reversing means including a first half bridge for connecting the motor to said d.c. voltage source, said first half bridge including a first half bridge controlled switch for controlled opening and closing and a second half bridge for connecting the motor to said d.c. voltage source, said second half bridge including a second half bridge controlled switch for controlled opening and closing, said first half bridge connecting said first pole of said excitation winding to said d.c. voltage source and said second half bridge connecting a pole of said armature to said d.c. voltage source;

a control unit controlling the opening and closing of each of said first half bridge controlled switch and said second half bridge controlled switch and toggling said reversing means as a function of the operating conditions of the motor, said control unit being programmed for toggling both of said first half bridge controlled switch and said second half bridge controlled switch cyclically, simultaneously or independently from an open condition to a closed condition and from a closed condition to an open condition; and a controlled switch device positioned for connection of said second pole of said excitation winding to said d.c. voltage source to connect together said excitation winding, said armature and said d.c. voltage source alternately in a configuration with series excitation and a configuration with separate excitation.

10. The circuit as claimed in claim 9, wherein said excitation winding and said armature are permanently connected in series.

11. The circuit as claimed in claim 9, wherein said control unit is programmed for braking of the motor including causing a zeroing of current in said armature, reversing a connection of the armature winding, and alternately making and breaking said first half bridge controlled switch and said second half bridge controlled switch at least during a part of the braking, simultaneously or independently of one another.

12. The circuit as claimed in clam 9, wherein said reversing means comprises an armature contactor for reversing the connection of the armature winding.

13. The circuit as claimed in claim 12, wherein said control unit is programmed to close said controlled switch device after the reversing of the connection of armature winding.

* * * * *